(12) United States Patent
Satish et al.

(10) Patent No.: US 9,235,390 B1
(45) Date of Patent: Jan. 12, 2016

(54) APPLICATION OPTIMIZATION FOR USE BASED ON FEATURE POPULARITY

(75) Inventors: Sourabh Satish, Fremont, CA (US); Brian Hernacki, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 1535 days.

(21) Appl. No.: 12/059,670

(22) Filed: Mar. 31, 2008

(51) Int. Cl.
*G06F 9/45* (2006.01)
*G06F 11/34* (2006.01)

(52) U.S. Cl.
CPC ............ *G06F 8/443* (2013.01); *G06F 11/3438* (2013.01); *G06F 2201/865* (2013.01)

(58) Field of Classification Search
None
See application file for complete search history.

(56) References Cited

U.S. PATENT DOCUMENTS

| | | | | |
|---|---|---|---|---|
| 5,428,786 A * | 6/1995 | Sites | | 717/151 |
| 5,511,198 A * | 4/1996 | Hotta | | 717/156 |
| 5,586,020 A * | 12/1996 | Isozaki | | 717/159 |
| 5,655,122 A * | 8/1997 | Wu | | 717/152 |
| 5,659,752 A * | 8/1997 | Heisch et al. | | 717/158 |
| 5,659,753 A * | 8/1997 | Murphy et al. | | 717/147 |
| 5,721,893 A * | 2/1998 | Holler et al. | | 712/239 |
| 5,732,273 A * | 3/1998 | Srivastava et al. | | 717/128 |
| 5,740,443 A * | 4/1998 | Carini | | 717/133 |
| 5,768,592 A * | 6/1998 | Chang | | 438/758 |
| 5,787,285 A * | 7/1998 | Lanning | | 717/130 |
| 5,797,013 A * | 8/1998 | Mahadevan et al. | | 717/160 |
| 5,797,019 A * | 8/1998 | Levine et al. | | 710/262 |
| 5,805,894 A * | 9/1998 | Robison | | 717/155 |
| 5,805,898 A * | 9/1998 | Barsness et al. | | 717/175 |
| 5,815,720 A * | 9/1998 | Buzbee | | 717/158 |
| 5,940,618 A * | 8/1999 | Blandy et al. | | 717/128 |
| 6,049,669 A * | 4/2000 | Holler | | 717/160 |
| 6,072,951 A * | 6/2000 | Donovan et al. | | 717/158 |
| 6,141,325 A * | 10/2000 | Gerstel | | 370/238 |
| 6,195,793 B1 * | 2/2001 | Schmidt | | 717/151 |
| 6,289,506 B1 * | 9/2001 | Kwong et al. | | 717/148 |
| 6,308,322 B1 * | 10/2001 | Serocki et al. | | 717/145 |
| 6,314,431 B1 * | 11/2001 | Gornish | | 712/205 |
| 6,658,656 B1 * | 12/2003 | Thompson | | 717/151 |
| 6,964,043 B2 * | 11/2005 | Wu et al. | | 717/159 |
| 6,993,755 B1 * | 1/2006 | Ungar | | 717/158 |
| 7,296,256 B2 * | 11/2007 | Liu et al. | | 717/104 |

(Continued)

OTHER PUBLICATIONS

"Code Optimization with IBM XL Compilers", IBM, 2004, <http://kiwi.atmos.colostate.edu/rr/tidbits/pdf/xl_optimization.pdf>, pp. 1-23.*

(Continued)

*Primary Examiner* — Thuy Dao
*Assistant Examiner* — Samuel Hayim
(74) *Attorney, Agent, or Firm* — Brill Law Office; Jeffrey Brill

(57) ABSTRACT

The popularity of various application features is tracked, and applications are compiled or otherwise configured for optimization based on the use of the more popular features. More specifically, application features are mapped to corresponding sections of underlying code, and compiler directives are generated to direct a compiler to optimize the application for the performance of specific, application features, based on their popularity. This way, the application is compiled for use at an application feature level, rather than for size or speed generally. In another embodiment, the optimization is performed after compile time, by rearranging object code pages of an executable image, based on corresponding application feature popularity.

14 Claims, 2 Drawing Sheets

(56) References Cited

U.S. PATENT DOCUMENTS

| | | | |
|---|---|---|---|
| 7,406,686 B2* | 7/2008 | Liu et al. | 717/151 |
| 7,694,291 B2* | 4/2010 | Chen et al. | 717/162 |
| 7,739,666 B2* | 6/2010 | Zhu et al. | 717/127 |
| 7,747,988 B2* | 6/2010 | Zhu et al. | 717/131 |
| 7,870,114 B2* | 1/2011 | Zhang et al. | 707/705 |
| 7,908,391 B1* | 3/2011 | Satish et al. | 709/232 |
| 7,917,901 B2* | 3/2011 | Pradadarao | 717/158 |
| 8,166,155 B1* | 4/2012 | Rachmeler et al. | 709/224 |
| 8,176,476 B2* | 5/2012 | Li et al. | 717/130 |
| 8,191,036 B2* | 5/2012 | Lowry et al. | 717/101 |
| 2001/0032332 A1* | 10/2001 | Ward et al. | 717/9 |
| 2001/0037497 A1* | 11/2001 | Kumon | 717/9 |
| 2002/0087717 A1* | 7/2002 | Artzi et al. | 709/236 |
| 2003/0033587 A1* | 2/2003 | Ferguson et al. | 717/104 |
| 2003/0041143 A1* | 2/2003 | Ronald et al. | 709/224 |
| 2003/0101444 A1* | 5/2003 | Wu et al. | 717/161 |
| 2004/0005919 A1* | 1/2004 | Walker et al. | 463/23 |
| 2004/0034814 A1* | 2/2004 | Thompson | 714/35 |
| 2004/0117760 A1* | 6/2004 | McFarling | 717/101 |
| 2005/0091651 A1* | 4/2005 | Curtis et al. | 717/168 |
| 2008/0201225 A1* | 8/2008 | Maharajh et al. | 705/14 |
| 2009/0119644 A1* | 5/2009 | de Vries et al. | 717/123 |

OTHER PUBLICATIONS

Youfeng Wu , "http://ieeexplore.ieee.org/stamp/stamp.jsp?tp=&arnumber=717399", ACM, 1994, <http://ieeexplore.ieee.org/stamp/stamp.jsp?tp=&arnumber=717399>, pp. 1-11.*

Somnath Ghosh et al., "Cache Miss Equations: A Compiler Framework for Analyzing and Tuning Memory Behavior", ACM, 1999, <http://delivery.acm.org/10.1145/330000/325479/p703-ghosh.pdf>, pp. 1-44.*

* cited by examiner

APPLICATION OPTIMIZATION FOR USE BASED ON FEATURE POPULARITY

TECHNICAL FIELD

This invention pertains generally to optimization of computer applications, and more specifically to optimizing applications based on application feature popularity.

BACKGROUND

The current generation of compilers are capable of optimizing application binary files for either size or speed. In other words, the complier can be directed to make an executable image that is as small as possible or as fast as possible. The speed versus size of a program is a classic and well understood tradeoff in computer science.

Current compiler optimization, whether for speed or size, does not take into account which specific features of an application are most likely to be used when the program is run. In fact, compilers have no notion of high level application features at all. Thus, the optimizations have limited direct user benefit. Although it is somewhat useful for the application to be as small as possible, or as fast as possible overall without regard to specific feature performance, such optimizations are not calibrated to the ways in which users interact with the resulting programs when they are run in the field.

It would be desirable to be able to compile and otherwise configure applications in a manner without these shortcomings.

SUMMARY

The popularity of various application features is tracked, and applications are compiled or otherwise configured for optimization based on the use of the more popular features. More specifically, application features are mapped to corresponding sections of underlying code, and compiler directives are generated to direct a compiler to optimize the application for the performance of specific, application features, based on their popularity. This way, the application is compiled for use at an application feature level, rather than for size or speed generally. In another embodiment, the optimization is performed after compile time, by rearranging object code pages of an executable image, based on corresponding application feature popularity.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
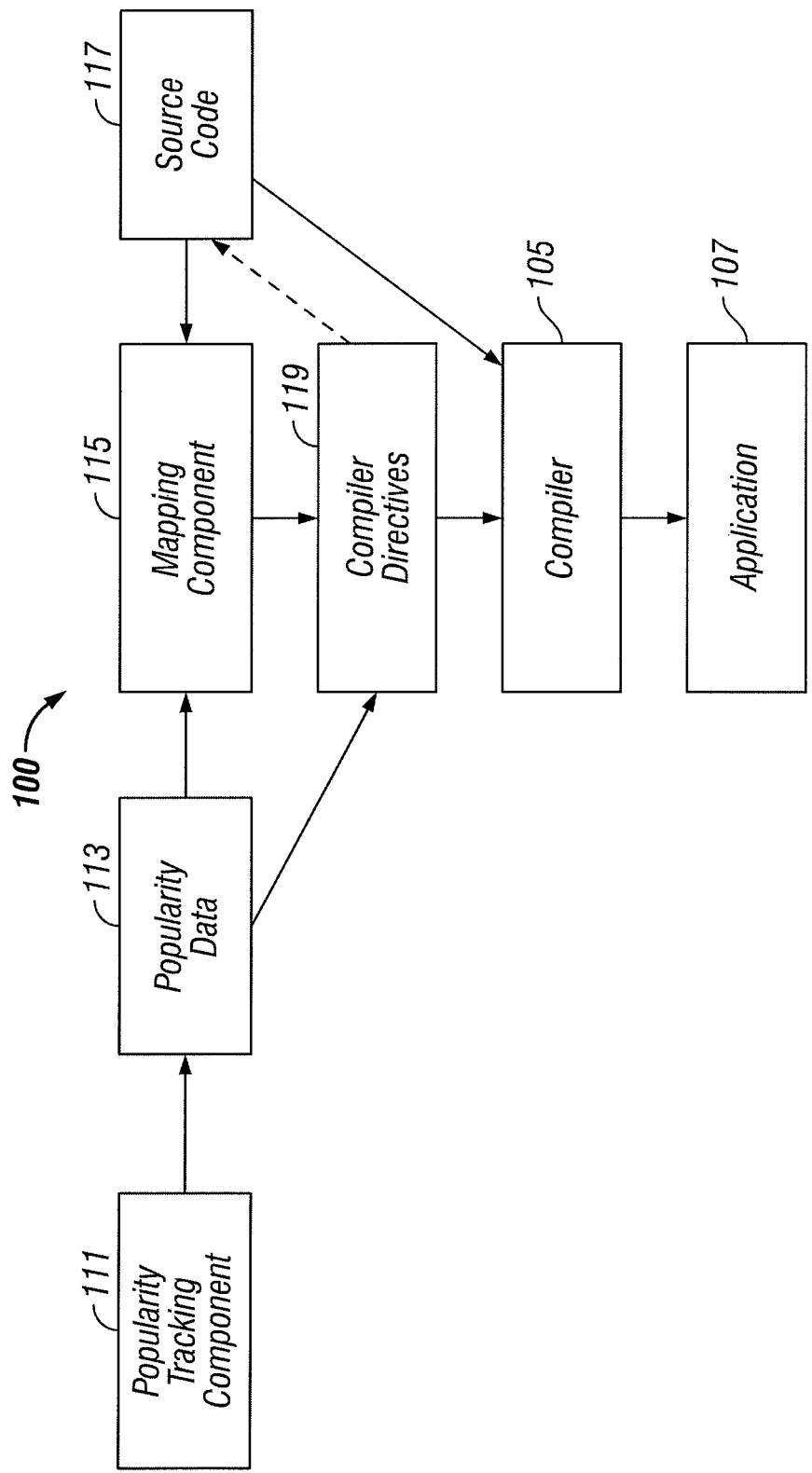
FIG. 1 is a block diagram illustrating application optimization based on application feature popularity, according to some embodiments of the present invention.

FIG. 1 illustrates a system 100 for optimizing an application based on application feature popularity, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a popularity tracking component 111 dynamically determines application feature popularity. A number of application feature popularity tracking packages are available today, and the implementation mechanics of such technology in the context of the present invention will be readily apparent to one of ordinary skill in the relevant art in light of this specification. Another embodiment uses the application tracking, methodology disclosed in the pending patent application titled "Application Streaming Profiling," having the same assignee as the present application, filed on Feb. 28, 2008 and now bearing Ser. No. 12/039,515 ("the Profiling Application").

The Profiling Application is herein incorporated by reference. The use of the methodologies disclosed in the Profiling Application to dynamically determine application feature popularity will be readily apparent to one of ordinary skill in the relevant art in light of this specification and the incorporated specification of the Profiling Application. In yet other embodiments, other methodologies for determining application feature popularity are used as desired.

A mapping component 115 maps specific program features of an application 107 to specific sections of the underlying source code 117. An application developer or the like provides the source code 117 for the application 107 being analyzed. The mapping component 115, by referring to the corresponding source code 117, can map specific program functionality back to specific sections of the source code 117, at least approximately. In some embodiments, some or all of this mapping is entered by, for example, an application developer, who has access to both the source code 117 and the popularity data 113.

It is to be understood that how much of the mapping is performed automatically by the mapping component 115, and how much is input by, e.g., an application developer, is a variable design parameter. The implementation mechanics of performing such mapping based on the popularity data 113 and the application source code 117 are within the skill set of one of ordinary skill in the relevant art, and the usage thereof within the context of the present invention will be readily apparent to one of such a skill level in light of this specification.

The popularity data 113 is analyzed to produce compiler directives 119, such that a compiler 105 can process the information. For example, the source code 117 can be marked by a developer, so as to indicate the relative popularity of corresponding features (e.g., with # or similar directives 119 that can be read by a compiler preprocessor). Such directives 119 can also be inserted into the source code 117 automatically by the mapping component 115.

Compiler directives need not be placed directly into the source code 117. In various embodiments, directives 119 can be in the form of data in a file, environment variables, configuration settings, command line options, etc. The compiler directives 119 can be as complicated as indications of exactly which source code 117 maps to which features and a ranking of the corresponding feature popularity, to something as simple as a listing of function names or other labels that pertain to more popular application features. The implementation mechanics of general compiler direction are known to those of ordinary skill in the relevant art, and the use of such techniques to direct a compiler 105 to designate specific sections of an application 107 for optimization will be readily apparent to one of such a skill level in light of this specification.

In any case, the compiler directives 119 are read and processed by a compiler 105 (or, e.g., a compiler 105 extension or the like) during a subsequent recompile of the application 107 (e.g., when a patch is being developed, when a new version is being created, etc.). The directives 119 inform the compiler 105 as to which sections of the source code 117 correspond to the more popular application features, and the compiler 105 compiles the application 107 for optimization of the performance of those more commonly used features. In other words, the application 107 is compiled for use at an application feature level, rather than for size or speed generally. This implies that the optimization is focused on the sections that correspond to more commonly used features, even the expense of degradation of performance for less popular features. It is to be understood that specific techniques for optimizing compilation of source code 117 are known by those of ordinary skill in the relevant art, and the use of such techniques to optimize specifically designated sections of an application 107 will be readily apparent to one of such a skill level in light of this specification.

Figure 2:
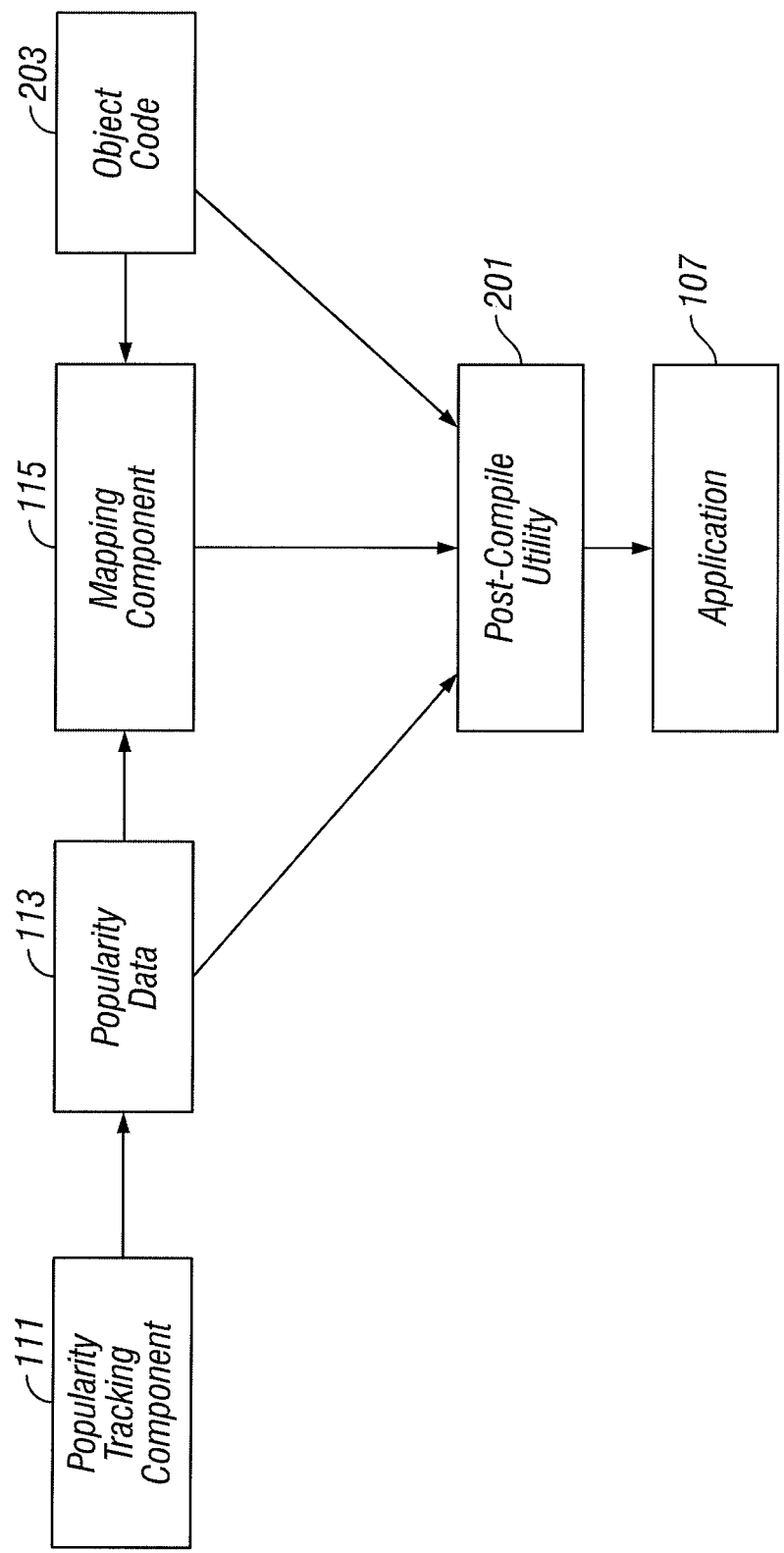
FIG. 2 is a block diagram illustrating application optimization based on application feature popularity, according to other embodiments of the present invention.

As illustrated in FIG. 2, in another embodiment of the present invention the feature based optimization is performed by a post-compile utility 201 that organizes object code 203 corresponding to specific functionalities of the application 107. In this embodiment, the mapping component 115 maps specific code pages 203 of an application 107 to program features based on the popularity data 113 and the source code 117, as opposed to mapping specific sections of the underlying source code 117 to application features. The post-compile utility 201 rearranges the code pages 203 comprising the application 107 (i.e., the executable image), so as to optimize for performance of the more popular features. Typically, this embodiment would be somewhat else effective than the compiler 105 based optimization embodiment described above in conjunction with FIG. 1.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for optimizing an application based upon popularity of application features, the method comprising the steps of:

determining, by a computer, a popularity measurement of each of a plurality of application features, wherein an application feature is high-level and corresponds to user activity at an application-level;

mapping, by the computer, application code sections of source code to the application features, an application code section comprising a plurality of instructions necessary to implement a particular application feature;

generating, by the computer, a plurality of compiler directives that are based on the determined popularity measurement of an application feature, each one of said directives being read and processed by a compiler and directing the compiler regarding compiling the application for optimization of the performance of specific, popular application features, each of said directives comprising an indication of which application source code maps to which features and a ranking of the corresponding feature popularity; and optimizing, by the computer, the application for performance of specific, application features, based on their popularity measurement.

2. The method of claim 1 wherein optimizing, by the computer, the application for performance of specific, application features, based on their popularity measurement further comprises:

compiling, by the computer, the application for optimization of the performance of specific, popular application features.

3. The method of claim 1 wherein said compiler directives are of types from a group of compiler directive types consisting of:

source code notations;
command line parameters;
file entries;
environment variables; and
configuration settings.

4. The method of claim 1, wherein optimizing, by the computer, the application for performance of specific, application features, based on their popularity measurement further comprises:

organizing, by the computer, code pages of an executable image for optimization of the performance of specific, popular application features.

5. The method of claim 1 further comprising:
dynamically updating, by the computer, the popularity measurement of at least one of the plurality of application features.

6. At least one non-transitory computer readable medium containing a computer program product for optimizing an application based upon popularity of application features, the computer program product comprising:
program code for determining a popularity measurement of each of a plurality of application features, wherein an application feature is high-level and corresponds to user activity at an application-level;
program code for mapping application code sections of source code to the application features, an application code section comprising a plurality of instructions necessary to implement a particular application feature;
program code for generating a plurality of compiler directives that are based on the determined popularity measurement of an application feature, each one of said directives being read and processed by a compiler and directing the compiler regarding compiling the application for optimization of the performance of specific, popular application features, each of said directives comprising an indication of which application source code maps to which features and a ranking of the corresponding feature popularity; and
program code for optimizing the application for performance of specific, application features, based on a corresponding popularity measurement.

7. The computer program product of claim 6 wherein the program code for optimizing the application for performance of specific, application features, based on their popularity measurement further comprises:
program code for compiling the application for optimization of the performance of specific, popular application features.

8. The computer program product of claim 6, wherein said compiler directives are of types from a group of compiler directive types consisting of:
source code notations;
command line parameters;
file entries;
environment variables; and
configuration settings.

9. The computer program product of claim 6 wherein the program code for optimizing the application for performance of specific, application features, based on their popularity measurement further comprises:
program code for organizing code pages of an executable image for optimization of the performance of specific, popular application features.

10. The computer program product of claim 6 further comprising:
program code for dynamically updating the popularity measurement of at least one of the plurality of application features.

11. A computer system for optimizing an application based upon popularity of application features, the computer system comprising:
a processor; and
computer memory, storing:
a popularity tracking component residing in the computer memory for determining a popularity measurement of each of a plurality of application features, wherein an application feature is high-level and corresponds to user activity at an application-level;
a mapping component residing in the computer memory for mapping application code sections of source code to the application features, an application code section comprising a plurality of instructions necessary to implement a particular application feature;
a directive-generating module residing in the computer memory for generating a plurality of compiler directives that are based on the determined popularity measurement of an application feature, each one of said directives being read and processed by a compiler directing the compiler regarding compiling the application for optimization of the performance of specific, popular application features, each of said directives comprising an indication of which application source code maps to which features and a ranking of the corresponding feature popularity; and
a compiler residing in the computer memory for optimizing the application for performance of specific, application features, based on a corresponding popularity measurement.

12. The computer system of claim 11 wherein the compiler residing in the computer memory for optimizing the application for performance of specific, application features, based on their popularity measurement further comprises:
a compiler residing in the computer memory for compiling the application for optimization of the performance of specific, popular application features.

13. The computer system of claim 11 wherein the compiler residing in the computer memory for optimizing the application for performance of specific, application features, based on their popularity measurement further comprises:
a compiler residing in the computer memory for organizing code pages of an executable image for optimization of the performance of specific, popular application features.

14. The computer system of claim 11 wherein the popularity tracking component residing in the computer memory further comprises:
a popularity tracking component residing in the computer memory for dynamically updating the popularity measurement of at least one of the plurality of application features.

\* \* \* \* \*